(12) United States Patent
Tamaizumi et al.

(10) Patent No.: US 8,738,229 B2
(45) Date of Patent: May 27, 2014

(54) ELECTRIC POWER STEERING DEVICE AND METHOD FOR CONTROLLING THE SAME

(75) Inventors: Terutaka Tamaizumi, Okazaki (JP); Hirozumi Eki, Okazaki (JP); Shinya Aono, Okazaki (JP); Jun Hasegawa, Okazaki (JP); Masayuki Kita, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 780 days.

(21) Appl. No.: 12/935,105

(22) PCT Filed: Apr. 15, 2009

(86) PCT No.: PCT/JP2009/057554
§ 371 (c)(1),
(2), (4) Date: Sep. 28, 2010

(87) PCT Pub. No.: WO2009/128466
PCT Pub. Date: Oct. 22, 2009

(65) Prior Publication Data
US 2011/0022270 A1 Jan. 27, 2011

(30) Foreign Application Priority Data
Apr. 15, 2008 (JP) ................................. 2008-105797

(51) Int. Cl.
| | |
|---|---|
| *A01B 69/00* | (2006.01) |
| *B62D 6/00* | (2006.01) |
| *B62D 11/00* | (2006.01) |
| *G05D 1/00* | (2006.01) |
| *G06F 7/00* | (2006.01) |

(52) U.S. Cl.
USPC .......................................................... 701/41

(58) Field of Classification Search
USPC .......................................................... 701/41
See application file for complete search history.

(56) References Cited

U.S. PATENT DOCUMENTS

| | | |
|---|---|---|
| 2003/0074120 A1 | 4/2003 | Kleinau |
| 2003/0146041 A1 | 8/2003 | Kanda |

(Continued)

FOREIGN PATENT DOCUMENTS

| | | |
|---|---|---|
| EP | 1 031 492 A1 | 8/2000 |
| EP | 1 932 745 A2 | 6/2008 |

(Continued)

OTHER PUBLICATIONS

International Preliminary Report on Patentability issued in PCT/JP2009/057554, issued Nov. 30, 2010.

(Continued)

*Primary Examiner* — Maceeh Anwari
(74) *Attorney, Agent, or Firm* — Oliff PLC (57) ABSTRACT

A current command value computing section includes an integration control computing section. Based on an integration of the steering torque τ, the integration control computing section computes a steering torque integration control amount Iint*, which is a compensation component for increasing the assist force. The integration control computing section functions as a determining device that determines whether the vehicle is traveling forward in a straight line. When the determining device determines that the vehicle is traveling forward in a straight line, the integration control computing section outputs the steering torque integration control amount Iint* to an adder. The current command value computing section superimposes the steering torque integration control amount Iint* on a basic assist control amount Ias* computed by a basic assist control section, and outputs the obtained value, as a current command value Iq* corresponding to a target assist force, to an output section.

4 Claims, 6 Drawing Sheets

(56) References Cited

U.S. PATENT DOCUMENTS

| | | |
|---|---|---|
| 2007/0029129 A1 | 2/2007 | Shiozawa et al. |
| 2010/0168963 A1* | 7/2010 | Yamamoto ............... 701/42 |

FOREIGN PATENT DOCUMENTS

| | | |
|---|---|---|
| JP | A 8-034358 | 2/1996 |
| JP | A-2002-29442 | 1/2002 |
| JP | A-2002-166482 | 6/2002 |
| JP | A 2002-274406 | 9/2002 |
| JP | A-2003-175851 | 6/2003 |
| JP | A-2003-226252 | 8/2003 |
| JP | A 2003-267250 | 9/2003 |
| JP | A 2005-343305 | 12/2005 |
| JP | A 2006-044505 | 2/2006 |
| JP | A 2007-022169 | 2/2007 |
| JP | A-2007-62712 | 3/2007 |
| JP | A-2007-112366 | 5/2007 |
| JP | A-2007-237837 | 9/2007 |

OTHER PUBLICATIONS

Feb. 8, 2012 Extended Search Report issued in European Patent Application No. 09732223.4.

International Search Report issued in corresponding International Application No. PCT/JP2009/057554, mailed Jul. 14, 2009. (with English-language translation).

Feb. 12, 2013 Office Action issued in Japanese Patent Application No. 2008-105797 (with translation).

* cited by examiner

ELECTRIC POWER STEERING DEVICE AND METHOD FOR CONTROLLING THE SAME

FIELD OF THE INVENTION

The present invention relates to an electric power steering device and a method for controlling the apparatus.

BACKGROUND OF THE INVENTION

Conventional power steering device for a vehicle include an electric power steering device (EPS) provided with a motor as a drive source. Generally, an EPS computes a basic component assist force applied to the steering system, or a basic assist control amount, based on a detected steering torque. In the computation of the basic assist control amount, a dead zone is established in which, when the steering torque is in a predetermined range, the basic assist control amount is set to zero regardless of the value of the steering torque. Thus, in a range including the neutral steering position, excessive assist force is not applied, and the rigid feel of steering is increased.

The surfaces of roads for vehicles are often inclined along the transverse direction in order to improve drainage performance. When a vehicle is traveling forward in a straight line on such an inclined road surface, or on a canted road, the steering wheel needs to be continuously manipulated by small steering angles so that the vehicle is not deflected by the inclination (cant).

However, the steering torque applied in such a case is so small that it is within the dead zone. Therefore, the driver must continue steering without benefitting from the power assist control. This increases the burden on the driver particularly when the vehicle keeps traveling on such a canted road for a long time.

To eliminate such a problem, a method has been proposed in which the condition of cant of the road is detected, and a control component is computed based on the detection result in order to prevent the vehicle from deflecting. The vehicle control apparatus of Patent Document 1 learns the cant of a road based on a plurality of detected state quantities such as the vehicle speed, lateral acceleration, steering state, and driving environment information. The vehicle control apparatus determines the state of cant by means of neural network computation using the results of the learning, thereby computing a control component for reducing the deflection of the vehicle due to the cant.

However, according to the conventional configuration, the computation load is great when accurately determining the state of the cant. This increases the costs. Also, the apparatus has a complicated structure.

Patent Document 1: Japanese Laid-Open Patent Publication No. 2007-22169

SUMMARY OF THE INVENTION

Accordingly, it is an objective of the present invention to provide an electric power steering device and a method for controlling the same that are capable of, with a simple structure, effectively applying assist force even during an extended period of traveling forward in a straight line.

To achieve the foregoing objective and in accordance with a first aspect of the present invention, an electric power steering device is provided that includes a steering force assist device and control device. The steering force assist device has a motor as a drive source and applies to a steering system an assist force for assisting steering operations. The control device controls the operation of the steering force assist device. The power steering device includes determining device that determines whether a vehicle is traveling forward in a straight line, computing device that computes a compensation component for increasing the assist force based on an integration of steering torque, and control device that superimposes the compensation component on the basic component when the determining device determines that the vehicle is traveling forward in a straight line.

That is, when a vehicle is traveling on a canted road, a steering torque required for maintaining the steering is a small value that is within the dead zone, for example. Even in this case, if the steering is maintained for a long time, the integrated value of the steering torque increases as the period of steering maintaining is extended. Therefore, by using the integrated value of the steering value (or an equivalent value), it is possible to determine whether the assist force needs to be increased and to accurately perform the computation of the compensation component used for increasing the assist force. The compensation component for increasing the assist force helps maintaining the steering for an extended period, thereby reducing the burden on the driver while the vehicle is traveling forward in a straight line. In contrast, when the vehicle is traveling forward in a non-straight line, the compensation component can cause excessively light steering or lowered rigid feel, due to excessive assist. However, in accordance with the above configuration, the compensation component is superimposed on the basic component of assist force only when the vehicle is traveling forward in a straight line. Thus, the excessively light steering or lowered rigid feel due to excessive assist are prevented. As a result, it is possible to effectively apply an assist force when the vehicle travels forward in a straight line for an extended period of time using a simple structure, while maintaining a favorable steering feel when the vehicle travels forward in a non-straight line.

Japanese Laid-Open Patent Publication No. 2001-247048 discloses a configuration that changes assist characteristic based on an integrated value of steering torque. Here, the integrated value of steering torque refers to a value per predetermined change in the steering angle. The device of this prior art determines the magnitude of energy required for steering to detect the road surface condition (road surface friction) and copes with changes in the road surface condition. The definition of the integrated value of steering torque is completely different from the integrated value of steering torque according to the present invention in terms of the concept of integrated time. The prior art therefore cannot solve the above presented problems.

In the above configuration, the computing device preferably integrates the compensation component when the determining device determines that the vehicle is traveling forward in a straight line.

When the vehicle is traveling forward in a straight line, the assist force tends to be insufficient if the steering needs to be maintained for an extended time, for example, when the vehicle is traveling on a canted road. On the other hand, if the compensation component is increased based on the integrated value of steering torque when the vehicle travels forward in a straight line for a short period of time, excessive assist can cause undesirable effects. However, by computing the integration of the steering torque only when the vehicle is traveling forward in a straight line as in the configuration, the compensation component is not excessively increased. Excessive assist and accompanying disadvantages are therefore prevented. As a result, it is possible to effectively apply assist force when the vehicle travels forward in a straight line for an extended period of time, while achieving a favorable steering feel when the vehicle travels forward in a non-straight line.

In the above configuration, the computing device preferably computes a steering torque determination value that changes in accordance with the magnitude of the steering torque, and computes the compensation component based on an integration of the steering torque determination value.

Accordingly, even if the detected steering torque is minute, the influence of displacement of neutral point or detection errors of the steering torque is eliminated, so that the compensation component is highly accurately computed.

According to the above configuration, the computing device preferably sets the steering torque determination value to zero in a range where the absolute value of the steering torque is less than or equal to a predetermine threshold value, and computes the steering torque determination value such that, in a range where the absolute value of the steering toque is greater than the threshold value, the greater the absolute value of the steering torque, the greater the absolute value of the steering torque determination value becomes.

To achieve the foregoing objective and in accordance with a second aspect of the present invention, a method for controlling an electric power steering device is provided. The device includes a steering force assist device and control device. The steering force assist device has a motor as a drive source and applies to a steering system an assist force for assisting steering operation. The control device controls the operation of the steering force assist device. The control device computes a basic component of the assist force to be generated by the steering force assist device based on the detected steering torque. The method for controlling a power steering device includes: determining whether the vehicle is traveling forward in a straight line; computing a compensation component for increasing the assist force based on an integration of steering torque; superimposing the compensation component on the basic component when it is determined that the vehicle is traveling forward in a straight line.

In the above method, it is preferable to integrate the compensation component when it is determined that the vehicle is traveling forward in a straight line.

In the above method, it is preferable to compute a torque determination value that changes in accordance with the magnitude of the steering torque, and computes the compensation component based on an integration of the steering torque determination value.

According to the above method, it is preferable to set the steering torque determination value to zero in a range where the absolute value of the steering torque is less than or equal to a predetermine threshold value, and to compute the steering torque determination value such that, in a range where the absolute value of the steering toque is greater than the threshold value, the greater the absolute value of the steering torque, the greater the absolute value of the steering torque determination value becomes.

DETAILE DESCRIPTION OF THE PREFERRED EMBODIMENTS

An electric power steering device (EPS) 1 according to one embodiment of the present invention will now be described with reference to the drawings.

Figure 1:
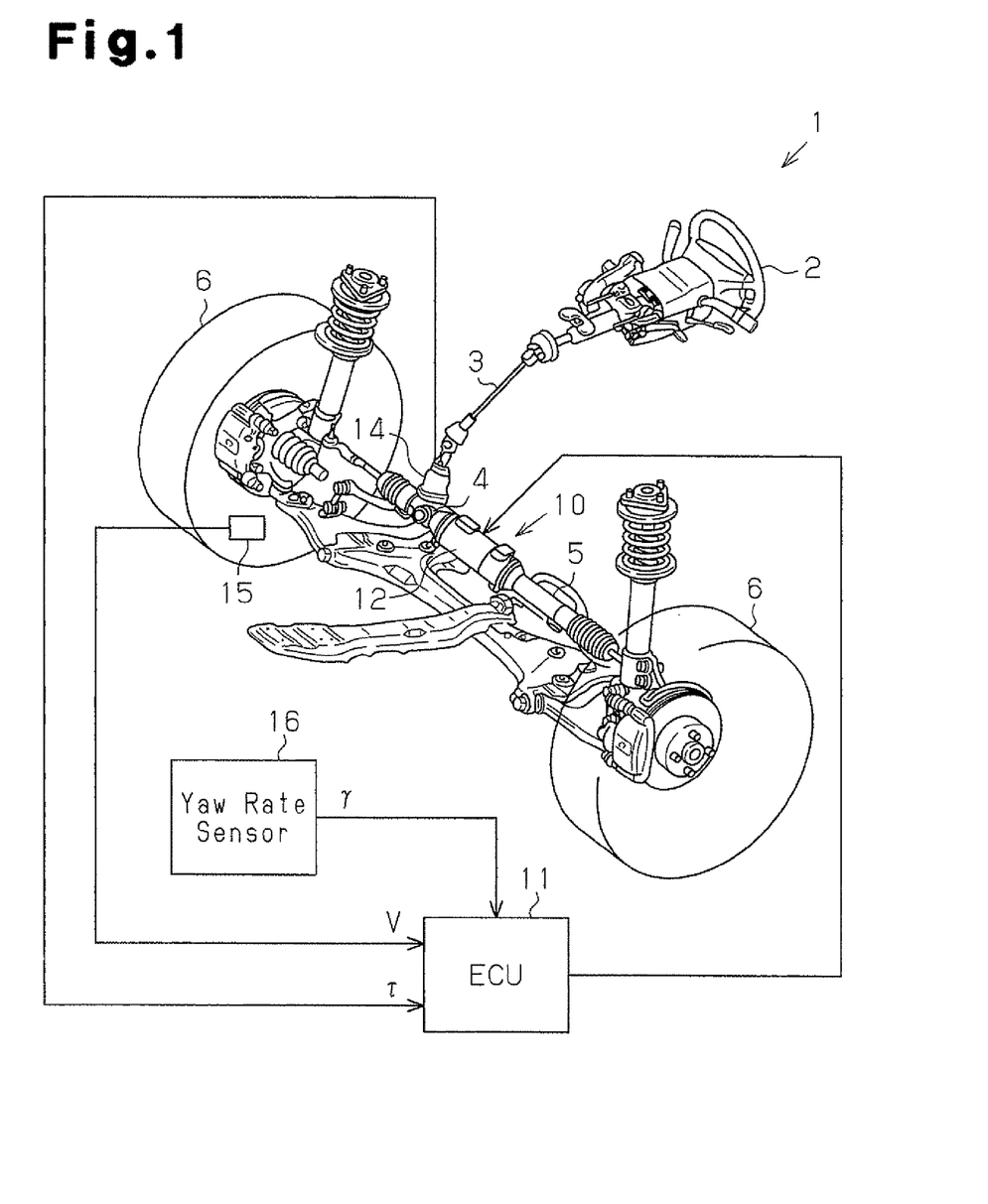
FIG. 1 is a schematic diagram of an electric power steering device (EPS)

As shown in FIG. 1, a steering wheel 2 is fixed to a steering shaft 3. The steering shaft 3 is coupled to a rack 5 via a rack-and-pinion mechanism 4. Rotation of the steering shaft 3 accompanying a steering operation is converted into a reciprocating linear motion of the rack 5 by the rack-and-pinion mechanism 4. The reciprocating linear motion of the rack 5 changes the steered angle of steerable wheels 6, or the tire angle, thereby changing the travel direction of the vehicle.

The EPS 1 includes an EPS actuator 10 serving as a steering force assist device, and an ECU 11 serving as control device. The EPS actuator 10 applies an assist force that assists a steering operation of the steering system. The ECU 11 controls operation of the EPS actuator 10.

The EPS actuator 10 is a rack type EPS actuator in which a motor 12 serving as a drive source is arranged coaxially with the rack 5. Motor torque generated by the motor 12 is transmitted to the rack 5 via a ball screw mechanism (not shown). The motor 12 is a brushless motor and is rotated by receiving three-phase (U, V, W) electric drive power from the ECU 11.

A torque sensor 14 and a vehicle speed sensor 15 are connected to the ECU 11. The ECU 11 detects a steering torque τ and a vehicle speed V based on output signals of these sensors. The ECU 11 computes a target assist force based on the steering torque τ and the vehicle speed V. The ECU 11 controls the operation of the EPS actuator 10, that is, assist force applied to the steering system, through supplying drive electricity to the motor 12, thereby generating the target assist force in the EPS actuator 10. A yaw rate sensor 16 is connected to the ECU 11. A yaw rate y detected by the yaw rate sensor 16 is used in steering torque integration control, which will be discussed below.

Next, a description will be given of assist control in the EPS 1 of the present embodiment.

Figure 2:
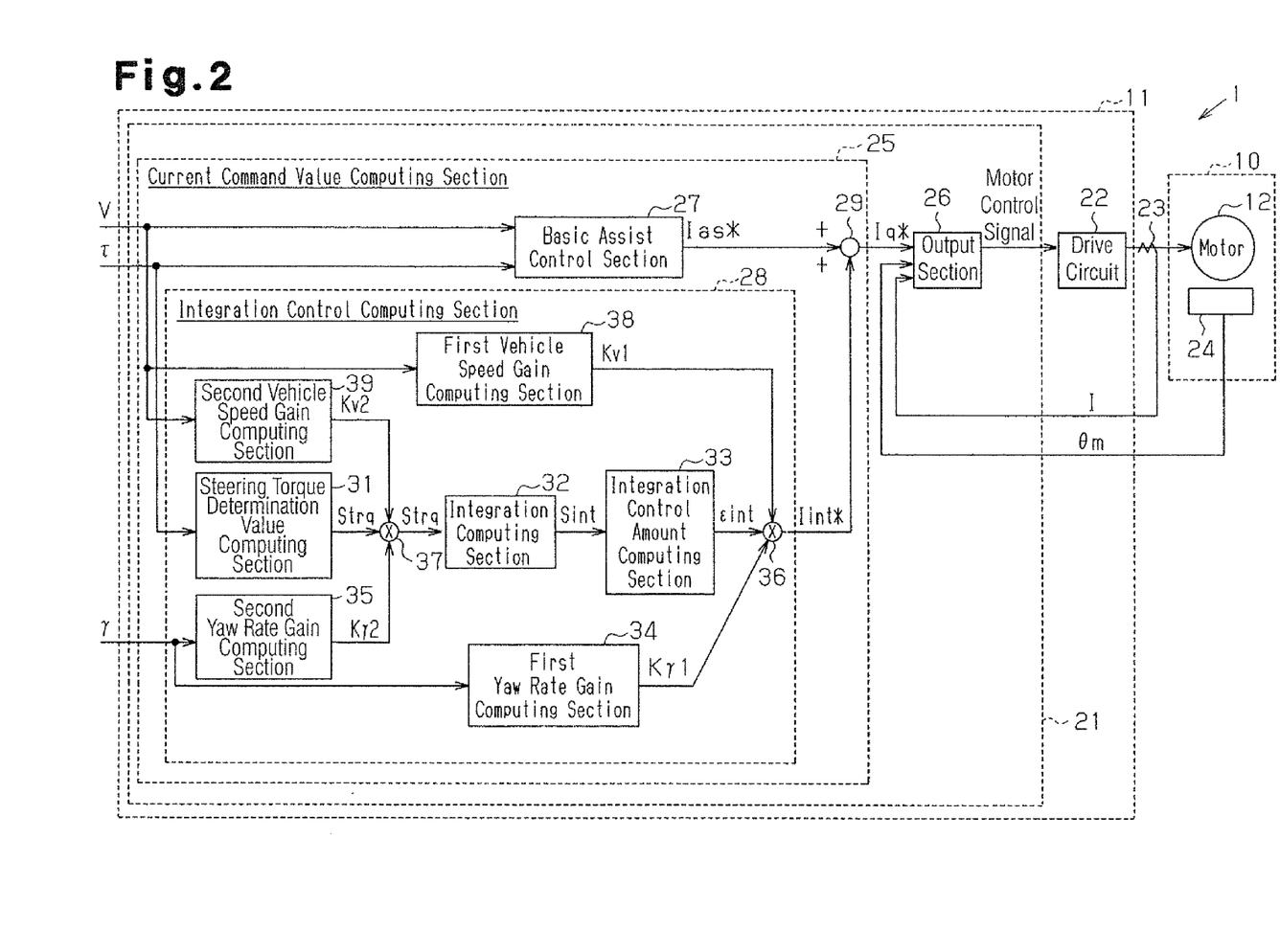
FIG. 2 is a control block diagram of the EPS.

As shown in FIG. 2, the ECU 11 includes a microcomputer 21 and a drive circuit 22. The microcomputer 21 outputs a motor control signal. The drive circuit 22 supplies the motor 12 with drive electricity based on the motor control signal.

The ECU 11 is connected to a current sensor 23 and a rotation angle sensor 24. The current sensor 23 detects the value I of the actual current supplied to the motor 12. The rotation angle sensor 24 detects the rotation angle θm of the motor 12. The microcomputer 21 outputs the motor control signal to the drive circuit 22 based on the actual current value I and the rotation angle θm of the motor 12, the steering torque τ, and the vehicle speed V.

The following control blocks are realized by a computer program executed by the microcomputer 21. The microcomputer 21 detects the state quantities described above at a predetermined sampling period and executes computation processes expressed by control blocks discussed below at a predetermined interval. This generates a motor control signal.

Specifically, the microcomputer 21 includes a current command value computing section 25 and a motor control signal output section 26 (hereinafter, referred to as an output section). The current command value computing section 25 computes a current command value Iq*, which corresponds to a target assist force to be generated by the EPS actuator 10. The output section 26 outputs a motor control signal based on the current command value Iq* computed by the current command value computing section 25.

The current command value computing section 25 includes a basic assist control section 27. The current command value computing section 25 computes a basic assist control amount Ias*, which is a basic component of the target assist force. The basic assist control section 27 receives the steering torque τ and the vehicle speed V. The greater the absolute value of the steering torque τ, and the smaller the vehicle speed V, the greater the basic assist control amount Ias* computed by the basic assist control section 27 becomes.

Figure 3:
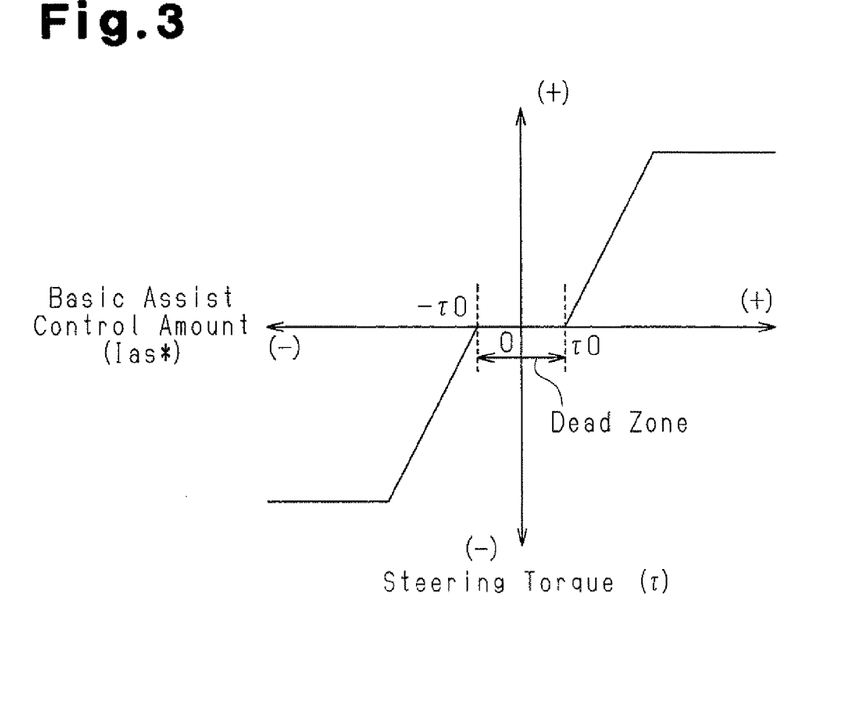
FIG. 3 is a chart showing computation of basic assist control.

As shown in FIG. 3, a range in which the absolute value of the detected steering torque τ is less than or equal to a predetermined threshold value ($-\tau 0 < \tau < \tau 0$) is defined as a dead zone, where the basic assist control amount Ias* is zero regardless of the steering torque τ.

The current command value computing section 25 outputs to the output section 26 a control component based on the basic assist control amount Ias* as a current command value Iq*, which corresponds to a target assist force of the power assist control.

Together with the current command value Iq*, the output section 26 receives the actual current value I and the rotation angle θm of the motor 12. The output section 26 computes a motor control signal by executing a current feedback control in such a manner as to make the actual current value I follow the current command value Iq* corresponding to the target assist force.

Specifically, the output section 26 carries out the current feedback control by converting a phase current value (Iu, Iv, Iw) of the motor 12 detected as the actual current value I into d, q-axis current values of a d/q coordinate system (d/q conversion).

The current command value Iq* is input as a q-axis current command value to the output section 26. The output section 26 subjects the phase current value (Iu, Iv, Iw) to the d/q conversion on the basis of the rotation angle θm. The output section 26 computes the d, q-axis voltage command value on the basis of the d, q-axis current value and the q-axis current command value. The output section 26 computes a phase voltage command value (Vu*, Vv*, Vw*) by the d/q inverse conversion of the d, q-axis voltage command value. The output section 26 generates a motor control signal on the basis of the phase voltage command value.

In the ECU 11, the microcomputer 21 outputs the motor control signal, which is generated in the above described manner, to the drive circuit 22, which in turn feeds the three-phase drive electric power based on the motor control signal to the motor 12. The ECU 11 controls operation of the EPS actuator 10.

(Steering Torque Integration Control)

Next, a description will be given of steering torque integration control in the EPS 1 of the present embodiment.

As described above, a steering maintaining operation for an extended period burdens the driver regardless of the magnitude of the steering torque. It is desirable to apply a sufficient assist force to reduce the burden on the driver. However, when the vehicle is traveling on a canted road, the value of steering toque is low and is in the dead zone. Therefore, sufficient assist force is not applied even through it is likely that maintaining of the steering will be performed for an extended period.

Taking this point into consideration, the microcomputer 21 is designed to compute a compensation component based on an integration of the steering torque τ. When the vehicle is traveling forward in a straight line, the microcomputer 21 superimposes the compensation component on the basic assist control amount Ias*, thereby increasing the assist force applied to the steering system.

That is, when a vehicle is traveling on a canted road, a steering torque τ required for maintaining the steering is a small value that is within the dead zone, for example. Even in this case, if the steering is maintained for a long time, the integrated value of the steering torque τ increases as the period of steering maintaining is extended. Therefore, by using the integrated value of the steering torque τ (or an equivalent value), it is possible to determine whether the assist force needs to be increased and to accurately perform the computation of the compensation component used for increasing the assist force. This allows an assist force to be effectively applied in a long time steering maintaining operation, and thus reduces the burden on the driver.

As shown in FIG. 2, a current command value computing section 25 of the microcomputer 21 includes an integration control computing section 28, in addition to the basic assist control section 27. The integration control computing section 28 computes a steering torque integration control amount Iint*, which is a compensation component based on an integration of the steering torque τ. The current command value computing section 25 superimposes the steering torque integration control amount Iint* on the basic assist control amount Ias* at an adder 29, and outputs the obtained value, as a current command value Iq* corresponding to the target assist force, to the output section 26.

Figure 4:
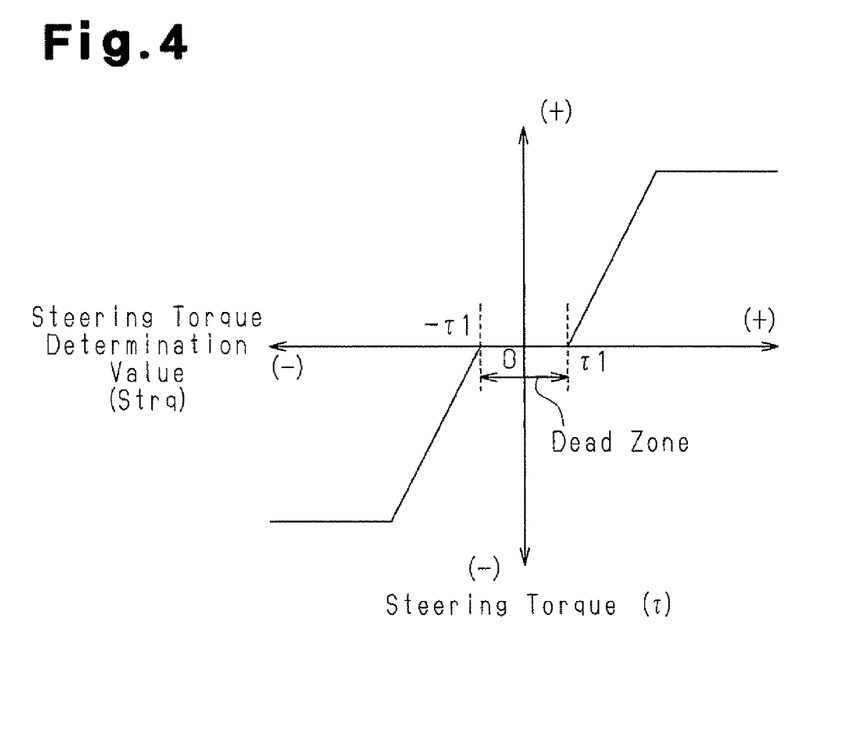
FIG. 4 is a chart showing computation of a steering torque determination value.

More specifically, the integration control computing section 28 includes a steering torque determination value computing section 31. The steering torque determination value computing section 31 computes, as a value equivalent to the steering torque τ, a steering torque determination value Strq that changes in accordance with the magnitude of the steering torque τ. As shown in FIG. 4, the greater the absolute value of the steering torque τ, the greater the steering torque determination value Strq becomes. A range in which the absolute value of the steering torque τ is less than or equal to a predetermined threshold value ($-\tau 1 < \tau < \tau 1$) is defined as a dead zone, where the steering torque determination value Strq is zero regardless of the steering torque τ. This eliminates the influence of displacement of the neutral point or detection errors in the steering torque τ.

As shown in FIG. 2, the steering torque determination value Strq (Strq') computed by the steering torque determination value computing section 31 is integrated by the integration computing section 32. A steering torque integrated value Sint, which is an integrated value of the steering torque determination value Strq (Strq') is sent to an integration control amount computing section 33. The integration control amount computing section 33 computes an integration control amount εint based on the steering torque integration value Sint. The integration control amount εint is used as a basis for the steering torque integration control amount Iint*.

Figure 5:
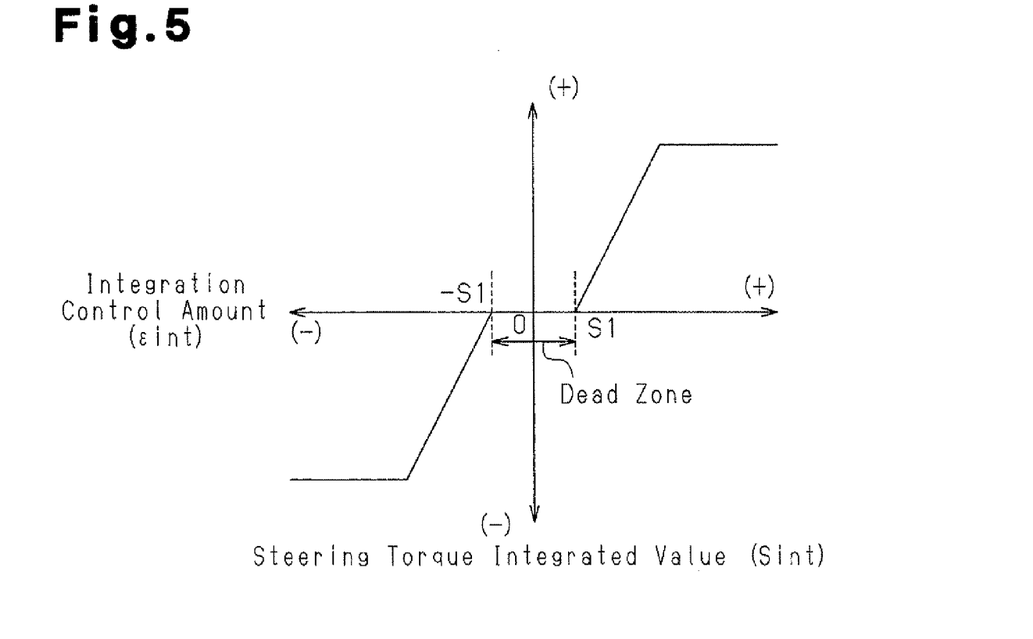
FIG. 5 is a diagram showing computation of an integrated control amount.

Specifically, as shown in FIG. 5, the greater the absolute value of the steering torque integration value Sint sent to the integration control amount computing section 33, the greater the absolute value of the integration control amount εint becomes, and the greater the amount of increase of the assist force becomes. A range in which the absolute value of the steering torque integration value Sint is less than or equal to a predetermined threshold value (−S1<τ<S1) is defined as a dead zone, where the integration control amount εint is zero regardless of the value of the steering torque integration value Sint. The integration control computing section 28 computes the steering torque integration control amount Iint* based on the integration control amount εint.

As shown in FIG. 2, the integration control computing section 28 receives the yaw rate γ detected by the yaw rate sensor 16. Based on the yaw rate γ, the integration control computing section 28 determines whether the vehicle is traveling forward in a straight line. Based on whether the vehicle is traveling forward in a straight line, the integration control computing section 28 outputs the steering torque integration control amount Iint* and executes integration of the steering torque determination value Strq, which is the basis of the steering torque integration control computation.

Figure 6:
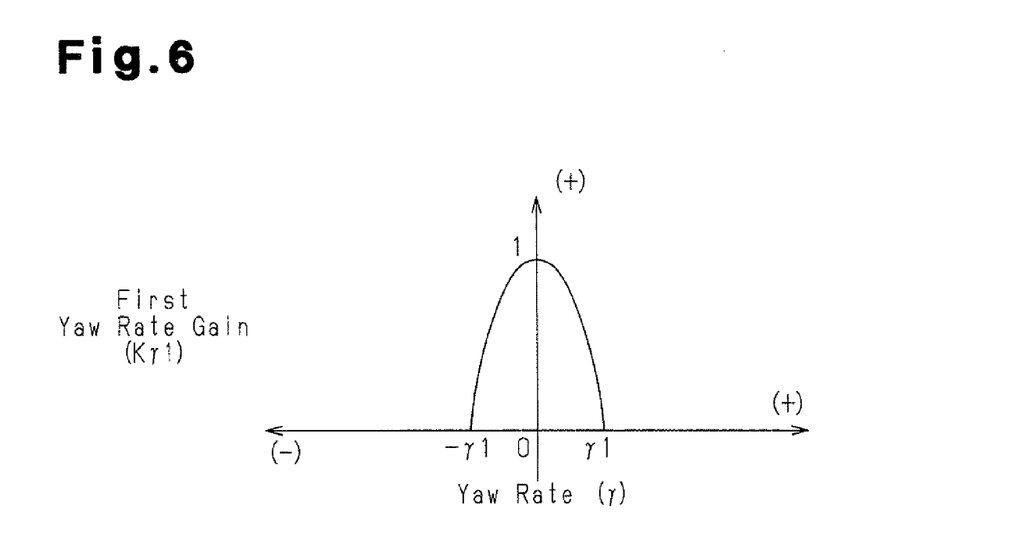
FIG. 6 is a chart showing computation of a first yaw rate gain.
Figure 7:
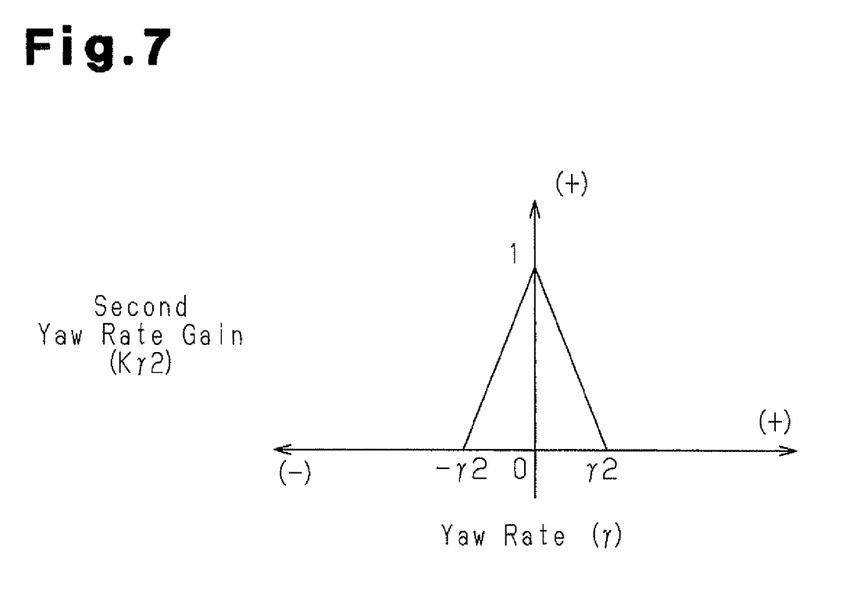
FIG. 7 is a chart showing computation of a second yaw rate gain.

Specifically, the integration control computing section 28 includes a first yaw rate gain computing section 34 and a second yaw rate computing section 35. As shown in FIG. 6, when the detected yaw rate γ is 0, the first yaw rate gain computing section 34 computes the value of the first yaw rate gain Kγ1 to be 1. When the absolute value of the yaw rate γ is greater than or equal to a predetermined threshold value γ1 (γ≥γ1, γ≤−γ1), the first yaw rate gain computing section 34 computes the value of the first yaw rate gain Kγ1 to be 0. Likewise, as shown in FIG. 7, when the detected yaw rate γ is 0, the second yaw rate gain computing section 35 computes the value of the second yaw rate gain Kγ2 to be 1. When the absolute value of the yaw rate γ is greater than or equal to a predetermined threshold value γ2 (γ≥γ2, γ≤−γ2), the second yaw rate gain computing section 35 computes the value of the second yaw rate gain Kγ2 to be 0.

As shown in FIG. 6, in a range where the absolute value of the yaw rate γ is less than the threshold value γ1 (−γ1<γ<γ1), the greater the absolute value of the yaw rate γ, the smaller the first yaw rate gain Kγ1 is continuously changed to be (0<Kγ1<1). Also, as shown in FIG. 7, in a range where the absolute value of the yaw rate γ is less than the threshold value γ2 (−γ2<γ<γ2), the greater the absolute value of the yaw rate γ, the smaller the second yaw rate gain Kγ2 is continuously changed to be (0<Kγ2<1).

Figure 8:
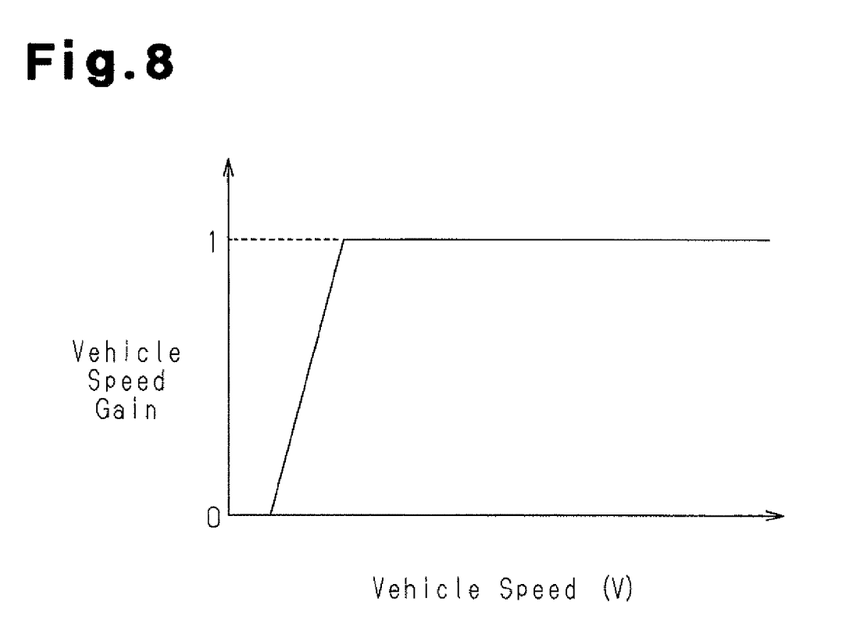
FIG. 8 is a chart showing computation of a vehicle speed gain.

As shown in FIG. 2, in the integration control computing section 28, the first yaw rate gain Kγ1 computed based on the yaw rate γ is sent to a multiplier 36 together with the integration control amount εint. Also, the integration control computing section 28 has a first vehicle speed gain computing section 38. Together with the first yaw rate gain Kγ1, the multiplier 36 receives a first vehicle speed gain Kv1 computed by the first vehicle speed gain computing section 38. The first vehicle speed gain computing section 38 sets a dead zone in a low speed range. The greater the vehicle speed V, the greater the value of the first vehicle speed gain Kv1 (see FIG. 8). In the multiplier 36, the integration control computing section 28 multiplies the integration control amount ε int by the first yaw rate gain Kγ1 (and by the first vehicle speed gain Kv1), and outputs the obtained value as the steering torque integration control amount Iint*. This inhibits the output of the steering torque integration control amount Iint* when the vehicle is traveling forward in a non-straight line.

That is, the steering torque integration control amount Iint* helps maintaining the steering for an extended period, thereby reducing the burden on the driver while the vehicle is traveling forward in a straight line. In contrast, when the vehicle is traveling forward in a non-straight line, the steering torque integration control amount Iint* can cause excessively light steering or lowered rigid feel, due to excessive assist. However, as described above, when the yaw rate γ indicates that the vehicle is traveling forward in a non-straight line (γ≥γ1, γ≤γ1), the integration control amount ε int, which is the basis of the steering torque integration control amount Iint*, is multiplied by the first yaw rate gain Kγ1, which is 0. Accordingly, the output value of the steering torque integration control amount Iint* is 0 when the vehicle is traveling forward in a non-straight line. Thus, the excessively light steering or lowered rigid feel due to excessive assist are prevented, and a favorable steering feel is achieved.

The second yaw rate gain Kγ2 is multiplied by the steering torque determination value Strq at a multiplier 37. Also, the multiplier 37 multiplies the steering torque determination value Strq not only by the second yaw rate gain Kγ2, but also by a second vehicle speed gain Kv2, which is computed by a second vehicle speed gain computing section 39. As in the case of the first vehicle speed gain computing section 38, the greater the vehicle speed V, the greater the value of the second vehicle speed gain Kv2 becomes. The variable range of the second vehicle speed gain Kv2 is set in a lower speed range than the first vehicle speed gain Kv1. Accordingly, the dead zone is set in a low speed range where the vehicle speed V is substantially 0. The integration computing section 32 integrates the steering torque determination value Strq', which has been multiplied by the second yaw rate gain Kγ2 (and the second vehicle speed gain Kv2), thereby computing the steering torque integration value Sint.

When the vehicle is traveling forward in a straight line, the assist force tends to be insufficient if the steering needs to be maintained for an extended time, for example, when the vehicle is traveling on a canted road. On the other hand, if the steering torque integration control amount Iint* is increased when the vehicle travels forward in a straight line for a short period of time, excessive assist can cause undesirable effects. However, when the yaw rate γ indicates that the vehicle is traveling forward in a non-straight line (γ≥γ2, γ≤−γ2), the steering torque determination value Strq is multiplied by the second yaw rate gain Kγ2, which is 0. Accordingly, during non-straight line traveling, the value of the multiplied steering torque determination value Strq' becomes 0, so that the steering torque determination value Strq' is not integrated. Also, if the vehicle speed V is in a low speed range near 0, the yaw rate γ becomes substantially 0, and it is impossible to determine whether the vehicle is traveling forward in a straight line. However, in this case, the second vehicle speed gain Kv2 becomes 0, and the multiplied steering torque determination value Strq' also becomes 0, so that the steering torque determination value Strq' is not integrated. Accordingly, integration of the steering torque determination value Strq' is performed only when the vehicle is traveling forward in a straight line. Excessive assist due to an excessive increase of the steering torque integration control amount Iint* and accompanying disadvantages are therefore prevented. Therefore, a favorable steering feel is achieved.

The preferred embodiment has the following operations and advantages.

(1) The current command value computing section 25 includes the integration control computing section 28. Based on an integration of the steering torque τ, the integration control computing section 28 computes the steering torque integration control amount Iint*, which is a compensation component for increasing the assist force. The integration control computing section 28 functions as determining device that determines whether the vehicle is traveling forward in a straight line. When determining that the vehicle is traveling forward in a straight line, the integration control computing section 28 outputs the steering torque integration control amount Iint* to the adder 29. The current command value computing section 25 superimposes the steering torque integration control amount Iint* on the basic assist control amount Ias* computed by the basic assist control section 27, and outputs the obtained value, as the current command value Iq* corresponding to a target assist force, to the output section 26.

That is, when a vehicle is traveling on a canted road, a steering torque τ required for maintaining the steering is a small value that is within the dead zone, for example. Even in this case, if the steering is maintained for a long time, the integrated value of the steering torque τ increases as the period of steering maintaining is extended. Therefore, by using the integrated value of the steering torque τ (or an equivalent value), it is possible to determine whether the assist force needs to be increased and to accurately perform the computation of the steering torque integration control amount Iint*, which is the compensation component used for increasing the assist force. The steering torque integration control amount Iint* helps maintaining the steering during an extended period of traveling forward in a straight line, thereby reducing the burden on the driver. However, when the vehicle is traveling forward in a non-straight line, excessive assist can cause excessively light steering or lowered rigid steering feel. In accordance with the above configuration, the steering torque integration control amount Iint* is superimposed on the basic assist control amount Ias* only when the vehicle is traveling forward in a straight line. Thus, the excessively light steering or lowered rigid feel due to excessive assist are prevented. As a result, it is possible to effectively apply an assist force when the vehicle travels forward in a straight line for an extended period of time using a simple structure, while maintaining a favorable steering feel when the vehicle travels forward in a non-straight line.

(2) The integration control computing section 28 includes the steering torque determination value computing section 31. The steering torque determination value computing section 31 computes, as a value equivalent to the steering torque τ, the steering torque determination value Strq, the value of which changes in accordance with the magnitude of the steering torque τ. The integration control computing section (the integration control amount computing section 33) computes the integration control amount ε int based on the steering torque integration value Sint, which is obtained by integrating the steering torque determination value Strq (Strq'). The integration control amount ε int is used as a basis of the steering torque integration control amount Iint*. Accordingly, even if the detected steering torque τ is minute, the influence of displacement of neutral point or detection errors of the steering torque τ is eliminated, so that the compensation component is highly accurately computed.

(3) The integration control computing section 28 integrates the steering torque determination value Strq only when the vehicle is traveling forward in a straight line. That is, when the vehicle is traveling forward in a straight line, the assist force tends to be insufficient if the steering needs to be maintained for an extended time, for example, when the vehicle is traveling on a canted road. On the other hand, if the steering torque integration control amount Iint* is increased when the vehicle travels forward in a straight line for a short period of time, excessive assist can cause undesirable effects. However, by integrating the steering torque determination value Strq' only when the vehicle is traveling forward in a straight line as described above, the steering torque integration control amount Iint* is not excessively increased. Excessive assist and accompanying disadvantages are therefore prevented. As a result, it is possible to effectively apply assist force when the vehicle travels forward in a straight line for an extended period of time, while achieving a favorable steering feel when the vehicle travels forward in a non-straight line.

The present embodiment may be modified as follows.

In the illustrated embodiment, the present invention is applied to a rack assist type EPS. However, the present invention may be applied to a column assist type EPS or other types of EPS.

In the illustrated embodiment, the integration control computing section 28 computes, as a value equivalent to the steering torque τ, the steering torque determination value Strq, which changes in accordance with the magnitude of the steering torque τ. Based on the steering torque integration value Sint, which is obtained by integrating the steering torque determination value Strq (Strq'), the integration control computing section 28 computes the integration control amount ε int, which is used as a basis of the steering torque integration control amount Iint*. This configuration may be changed. Specifically, the integration control computing section 28 may simply compute a compensation component based on an integrated value of the detected steering torque τ.

In the illustrated embodiment, the integration control computing section 28 computes the first yaw rate gain Kγ1 and the second yaw rate gain Kγ2 based on the yaw rate γ, and multiplies the integration control amount ε int and the steering torque determination value Strq by the first and second yaw rate gains Kγ1 and Kγ2, respectively. Accordingly, the integration control computing section 28 determines whether the vehicle is traveling forward in a straight line. Based on the result of the determination, the integration control computing section 28 outputs the steering torque integration control amount Iint* and integrates the steering torque determination value Strq, which is used as a basis of the steering torque integration control computation. This configuration may be changed. Specifically, the integration control computing section 28 may determine whether the vehicle is traveling forward in a straight line based on a state quantity other than the yaw rate γ, or based on a combination of state quantities other than the yaw rate γ.

Figure 9:
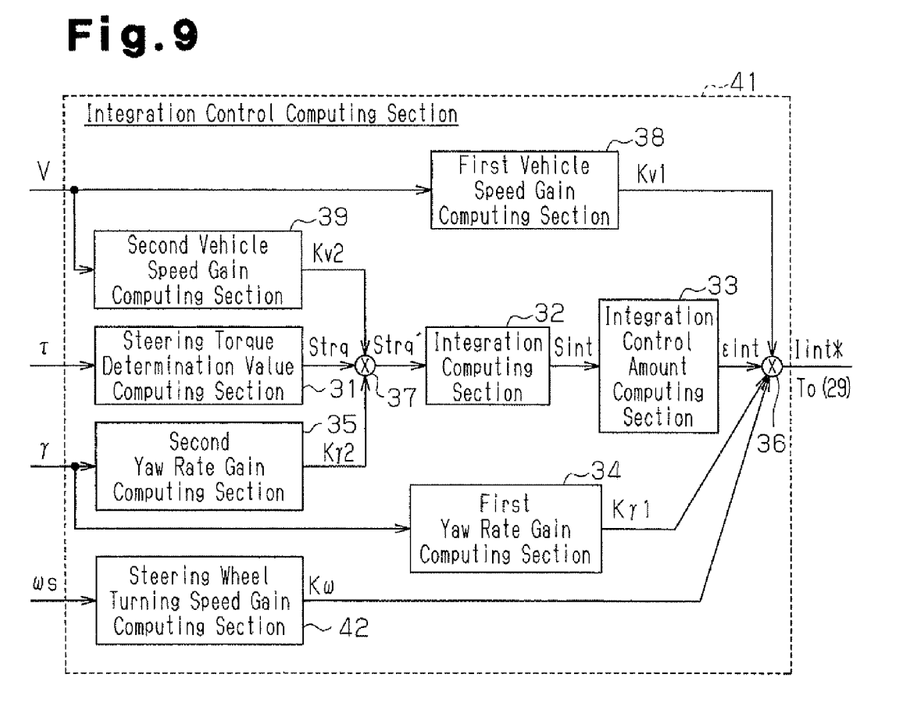
FIG. 9 is a control block diagram of an integration control computing section according to a modified embodiment.
Figure 10:
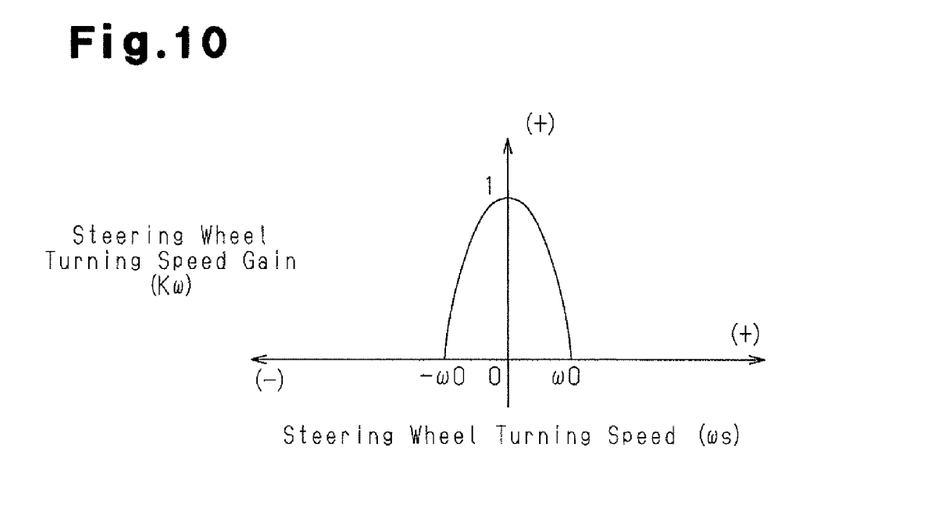
FIG. 10 is a chart showing computation of a steering wheel turning speed gain.

For example, a configuration shown in FIG. 9 may be employed. In this case, an integration control computing section 41 includes a steering wheel turning speed gain computing section 42. When a steering wheel turning speed ωs is 0, the value of a steering wheel turning speed gain Kω is computed to be 1. When the absolute value of the steering wheel turning speed ωs is greater than or equal to a predetermined threshold value ω0 (ωs≥ω0, ωs≤−ω0), the value of the steering wheel turning speed gain Kω is computed to be 0 (see FIG. 10). In a range where the absolute value of the steering wheel turning speed ωs is less than the threshold value ω0 (−ω0<ωs<ω0), the greater the absolute value of the steering wheel turning speed ωs, the smaller the steering wheel turning speed gain Kω is continuously changed to be. The integration control computing section 41 may multiply the integration control amount ε int not only by the first yaw rate gain Kγ1, but also by the steering wheel turning speed gain Kω.

As in the case of the first yaw rate gain Kγ1, when the steering wheel turning speed ωs is in a range that indicates that the vehicle is traveling forward in a non-straight line (ωs≥ω0, ωs≤−ω0), the accuracy of the determination whether the vehicle is traveling forward in a straight line is improved by computing the value of the steering wheel turning speed gain Kω to be 0. The integration control computing section 41 then multiplies the integration control amount ε int not only by the first yaw rate gain Kγ1, but also by the steering wheel turning speed gain Kω. This accurately inhibits the output of the steering torque integration control amount Iint* when the vehicle is traveling forward in a non-straight line. The steering torque determination value Strq may be multiplied not only by the second yaw rate gain Kγ2, but also by the steering wheel turning speed gain Kω. Accordingly, integration of the steering torque determination value Strq' is more accurately performed only when the vehicle is traveling forward in a straight line.

Further, whether the vehicle is traveling forward in a straight line may be determined independently from the computation of various gains for inhibiting the steering torque integration control amount Iint* from being output and the computation of various gains or for allowing the steering torque determination value Strq' to be integrated only when the vehicle is traveling forward in a straight line.

An upper limit may be set for the number of times of integration of the steering torque τ (or the steering torque determination value Strq equivalent to the steering torque τ). In this case, when the number of times of integration reaches the upper limit, the oldest value is preferably replaced by the newest value. This configuration is advantageous in coping with a situation where a normal steering is performed after steering maintaining has been performed for an extended period.

The invention claimed is:

1. An electric power steering device, comprising:
a steering force assist device, the steering force assist device having a motor as a drive source and applying to a steering system an assist force for assisting steering operation;
a control device, wherein the control device controls the operation of the steering force assist device and computes a basic component of the assist force to be generated by the steering force assist device based on a detected steering torque;
a determining device that determines whether a vehicle is traveling forward in a straight line; and
a computing device that computes a compensation component for increasing the assist force based on an integration of the steering torque, wherein
the control device superimposes the compensation component on the basic component when the determining device determines that the vehicle is traveling forward in a straight line,
the computing device is configured to determine a steering torque determination value that changes in accordance with the magnitude of the steering torque, and to compute the compensation component based on an integration of the steering torque determination value, and
the computing device is configured to determine the steering torque determination value by:
setting the steering torque determination value to zero in a range where the absolute value of the steering torque is less than or equal to a predetermined threshold value, and
computing the steering torque determination value such that, in a range where the absolute value of the steering torque is greater than the predetermined threshold value, the greater the absolute value of the steering torque, the greater the absolute value of the steering torque determination value becomes.

2. The electric power steering device according to claim 1, wherein the computing device is configured to compute the compensation component by integration only when the determining device determines that the vehicle is traveling forward in a straight line.

3. A method for controlling an electric power steering device comprising a steering force assist device, the steering force assist device having a motor as a drive source and applying to a steering system an assist force for assisting steering operation, and a control device that controls the operation of the steering force assist device and computes a basic component of the assist force to be generated by the steering force assist device based on a detected steering torque, the method comprising:
determining whether a vehicle is traveling forward in a straight line;
computing a compensation component for increasing the assist force based on an integration of a value based on the steering torque;
superimposing the compensation component on the basic component when it is determined that the vehicle is traveling forward in a straight line; and
determining a steering torque determination value that changes in accordance with the magnitude of the steering torque, wherein the computing of the compensation component is based on an integration of the steering torque determination value,
wherein the step for determining the steering torque determination value includes:
setting the steering torque determination value to zero in a range where the absolute value of the steering torque is less than or equal to a predetermined threshold value, and
computing the steering torque determination value such that, in a range where the absolute value of the steering torque is greater than the predetermined threshold value, the greater the absolute value of the steering torque, the greater the absolute value of the steering torque determination value becomes.

4. The method for controlling an electric power steering device according to claim 3, further comprising computing the compensation component by integration only when it is determined that the vehicle is traveling forward in a straight line.

* * * * *